United States Patent
Konchan et al.

[11] Patent Number: 5,358,301
[45] Date of Patent: Oct. 25, 1994

[54] COUNTERBALANCE MECHANISM FOR A REMOVABLE TAILGATE

[75] Inventors: Jeffrey L. Konchan, Shelby Township, Macomb County; William W. Froehner, Troy, both of Mich.

[73] Assignee: General Motors Corporation, Detroit, Mich.

[21] Appl. No.: 156,111

[22] Filed: Nov. 22, 1993

[51] Int. Cl.⁵ .......................................... B62D 33/033
[52] U.S. Cl. ............................. 296/146.1; 296/59; 16/75; 16/308; 49/386; 49/389
[58] Field of Search ................. 296/57.1, 59, 146.1; 16/75, 308; 49/386, 389; 292/DIG. 72

[56] References Cited

U.S. PATENT DOCUMENTS

| | | | |
|---|---|---|---|
| 2,984,517 | 5/1961 | Farrow et al. | 296/57.1 |
| 3,490,175 | 1/1970 | Romberg | 16/75 X |
| 4,143,904 | 3/1979 | Cooper et al. | 296/57.1 |
| 4,701,977 | 10/1987 | Hori et al. | 16/266 |
| 5,039,154 | 8/1991 | Lewis | 296/52 |

FOREIGN PATENT DOCUMENTS

| | | | |
|---|---|---|---|
| 2320832 | 11/1974 | Fed. Rep. of Germany | 16/75 |
| 0920519 | 4/1947 | France | 296/57.1 |
| 0962567 | 9/1982 | U.S.S.R. | 16/75 |

OTHER PUBLICATIONS

Research Disclosure Publication, Oct. 1992, p. 797, No. 342101, entitled "Counter Balance Mechanism for a Removable Tailgate".

Primary Examiner—Dennis H. Pedder
Attorney, Agent, or Firm—Charles E. Leahy

[57] ABSTRACT

According to the invention, a closure panel, such as a tailgate, is removably connected to a vehicle body for pivotal movement about a hinge axis. The panel may be removably lifted from the vehicle body when the panel is pivoted to a panel removal position. A torque rod counterbalance spring is carried by the panel and includes an elongated portion extending between a crank end anchored to the panel for pivotal movement therewith and a stationary end. A support device is anchored to the vehicle body and captures the stationary end of the torque rod to restrain its pivotal movement so that the torque rod is torsionally wound when the panel is pivoted away from the panel removal position to provide a counterbalance force for continuously urging the panel towards the panel removal position. The torque rod is completely unwound when the panel is pivoted to the panel removal position. The support device captures the stationary end by a releasable slip-fitted connection therewith so that the stationary end is released from the support means when the panel is removably lifted from the vehicle body. The torque rod and support device cooperatively provide a counterbalance effort to assist with pivotal movement of the panel and to permit facile removal of the panel and the torque rod from the vehicle body.

10 Claims, 4 Drawing Sheets

COUNTERBALANCE MECHANISM FOR A REMOVABLE TAILGATE

This invention relates to a tailgate which is removable from a vehicle body, and in particular, to an improved counterbalance mechanism having a torque rod counterbalance spring which assists with opening and closing of the tailgate and yet permits facile removal of the tailgate and torque rod from the vehicle body.

BACKGROUND OF THE INVENTION

It is well known to provide a tailgate which is hingedly mounted to a truck body for pivotal movement about a hinge axis between an open horizontal position and a closed vertical position. It is common to provide detachable folding straps to support the tailgate in the open position.

It is also well known for the tailgate to be removable from the truck body when the tailgate is pivoted to a partially open tailgate removal position. Typically, the tailgate may include hinge pins extending outwardly along the hinge axis which are shaped to removably connect into cup-shaped trunnions carried by the truck body. When the tailgate is pivoted to the tailgate removal position, one of the hinge pins is positioned for removal through a slot in its connecting trunnion when the tailgate is lifted from the truck body.

It is well known for the hinge pins to be freely rotatable within the trunnions, such that the weight of the tailgate is raised and lowered manually by the operator when the tailgate is moved between the open and closed positions.

Since trucks are now commonly being used by a wide variety of operators, it would be desirable to provide counterbalance effort to assist with the opening and closing of tailgate and yet still permit removal of the tailgate from the truck body. The prior art discloses counterbalance mechanisms, such as springs, struts and torsion bars, for use with tailgates; however, these mechanisms do not permit removal of the tailgate.

The prior art also discloses a removable tailgate having a pinion in place of a hinge pin. The pinion matably engages with a counterbalance spring comprised of a spring-loaded rack assembled inside the truck body to provide a counterbalance effort. However, this rack and pinion arrangement has the shortcoming that the operator must match up the rack and pinion gears while assembling the tailgate to the truck body and that the counterbalance spring is not subassembled with the tailgate and is not removable with the tailgate from the vehicle body.

Thus, it would be desirable to provide an improved counterbalance mechanism for a removable tailgate which assists with the opening and closing of the tailgate, allows for subassembly of the counterbalance spring with the tailgate and permits facile removal of the tailgate and counterbalance spring from the vehicle body.

SUMMARY OF THE INVENTION

According to the invention, a closure panel, such as a tailgate, is removably connected to a vehicle body for pivotal movement about a hinge axis. The panel may be removably lifted from the vehicle body when the panel is pivoted to a panel removal position. A torque rod counterbalance spring is carried by the panel and includes an elongated portion extending between a crank end anchored to the panel for pivotal movement therewith and a stationary end.

A support device is anchored to the vehicle body and captures the stationary end of the torque rod to restrain its pivotal movement so that the torque rod is torsionally wound when the panel is pivoted away from the panel removal position to provide a counterbalance force for continuously urging the panel towards the panel removal position. The torque rod is completely unwound when the panel is pivoted to the panel removal position. The support device captures the stationary end by a releasable slip-fitted connection therewith so that the stationary end is released from the support means when the panel is removably lifted from the vehicle body. The torque rod and support device cooperatively provide a counterbalance effort to assist with pivotal movement of the panel and to permit facile removal of the panel and the torque rod from the vehicle body.

Accordingly, it is an object, feature and advantage of this invention to provide an improved counterbalance mechanism for a removable tailgate which assists with opening and closing of the tailgate, and yet permits facile removal of the tailgate and torque rod from the vehicle body.

It is a further object of this invention to provide a counterbalance mechanism which allows for subassembly of the torque rod with the tailgate, and also permits facile installation of the tailgate and torque rod to the vehicle body.

BRIEF DESCRIPTION OF THE DRAWINGS

These and other features, objects and advantages of the present invention will become apparent upon consideration of the following description, appended claims and accompanying drawings in which:

DESCRIPTION OF THE PREFERRED EMBODIMENT

Figure 1:
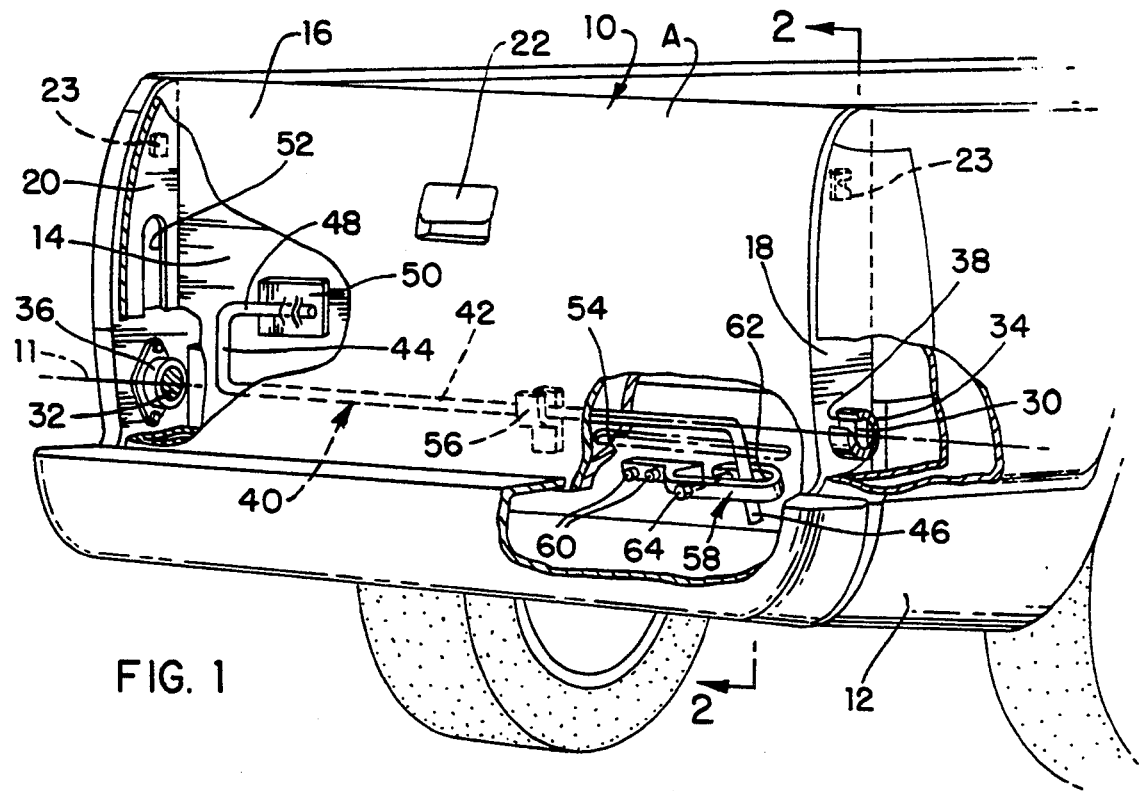
FIG. 1 is a perspective rear view of a truck body having a removable tailgate shown in a fully closed position A and showing the tailgate partially-broken-away.
Figure 2:
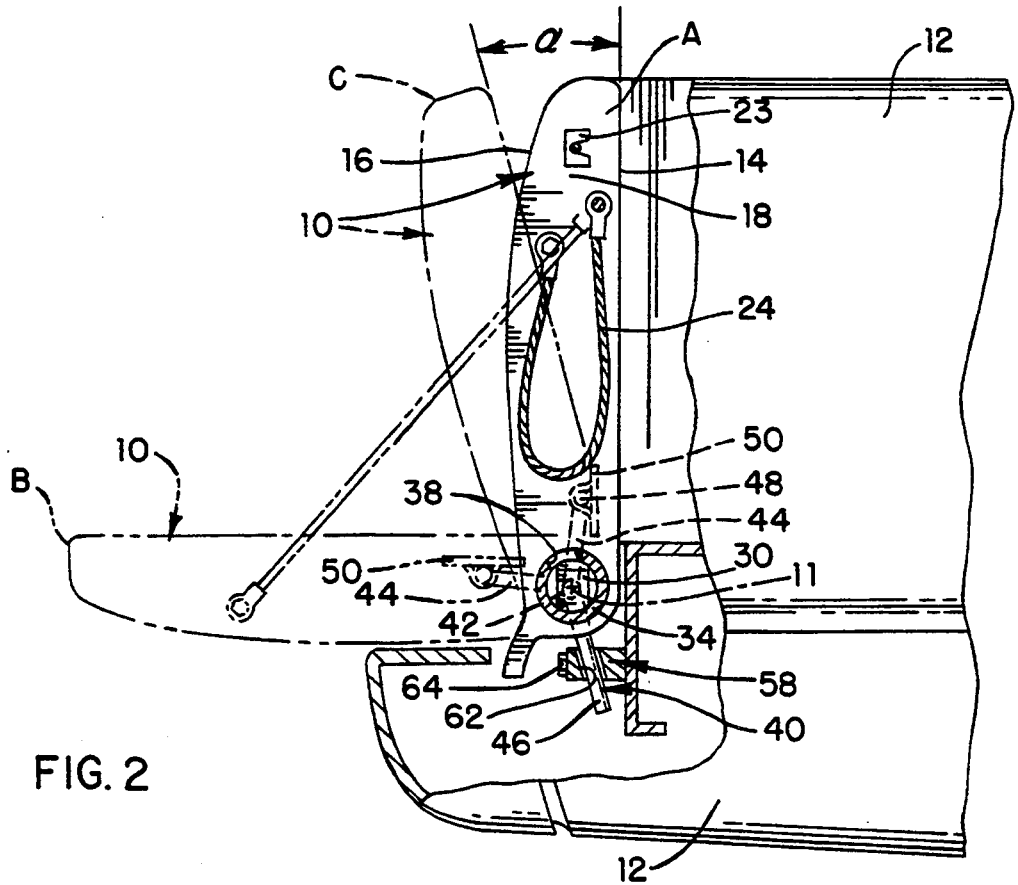
FIG. 2 is a sectional view taken along line 2—2 of FIG. 1 showing the tailgate in the solid-line indicated closed position A, in the phantom-line indicated open position B, and in the phantom-line indicated partially open tailgate removal position C.

Referring to FIGS. 1 and 2, a tailgate 10 is hingedly mounted to a truck body 12 for pivotal movement about a hinge axis 11 between a closed vertical position A and an open horizontal position B. The tailgate 10 includes an inner panel 14 and an outer panel 16 closed by right and left side panels 18, 20 defining a hollow area within the tailgate 10. A conventional handle 22 and latch mechanism 23 hold the tailgate 10 in the closed position A. As shown in FIG. 2, typical detachable folding straps 24 extend between the tailgate 10 and the truck body 12 to support the tailgate 10 in the open position B.

As best shown in FIG. 1, a pin 30 is carried by the right side panel 18 of the tailgate 10 for pivotal movement with the tailgate 10, extends along the hinge axis 11, and has an oblong shaped cross section. A shaft 32 is carried by the left side panel 20 of the tailgate 10 for pivotal movement with the tailgate 10, extends along the hinge axis 11, and has a circular cross section.

A first trunnion 34 is carried by the right side of the truck body 12, extends along the hinge axis 11, and is cup-shaped for rotatably supporting the pin 30 therein. A second trunnion 36 is carried by the left side of the truck body 12, extends along the hinge axis 11, and is cup-shaped for rotatably supporting the shaft 32 therein.

Referring to FIG. 2, the tailgate 10 is removably connected to the truck body 12, such that the tailgate 10 may be removably lifted from the truck body 12 by manual manipulation when the tailgate 10 is pivoted to a partially open tailgate removal position C. The first trunnion 34 has a slot 38 which permits removal of the pin 30 from the first trunnion 34 through the slot 38 when the tailgate 10 is pivoted to the removal position C and lifted from the truck body 12 at a removal angle α. The second trunnion 36 has an inner diameter slightly larger than the outer diameter of the shaft 32 to permit the shaft 32 to be laterally pulled out of the second trunnion 36 after removal of the pin 30 from the first trunnion 34 so that the tailgate 10 is removably lifted from the truck body 12.

As best shown in FIG. 1, a torque rod counterbalance spring 40 is carried by the tailgate 10 and includes an elongated portion 42 extending between a crank end 44 and a stationary end 46. The elongated portion 42 is preferably parallel to the hinge axis 11 of the tailgate 10. The crank end 44 is laterally bent relative the elongated portion 42, extends upwardly, and includes an anchoring end 48 inserted through a lanced reinforcement plate 50 mounted on the inner panel 14 of the tailgate 10 so that the crank end 44 is anchored to the tailgate 10 for pivotal movement with the tailgate 10. The stationary end 46 is also laterally bent relative the elongated portion 42 and extends downwardly out through an aperture 54 in the tailgate 10. The torque rod 40 has a completely unwound neutral position in which the crank end 44 and the stationary end 46 are preferably parallel.

A rigid support bracket 58 underlies the aperture 54 in the tailgate 10 and is mounted to the truck body 12, such as by fasteners 60. The bracket 58 has a slotted opening 62 for capturing the stationary end 46 of the torque rod 40 therein by a releasable slip-fitted connection therewith. The slotted opening 62 is parallel to the tailgate 10 when the tailgate 10 is pivoted to the removal position C. The slotted opening 62 is sized larger than the cross section of the stationary end 46 for easily capturing and releasing the stationary end 46, as will be described hereinafter. A clamp bolt 64 may be included on the bracket 58 to adjust the size of the slotted opening 62. When the tailgate 10 is installed on the truck body 12, the stationary end 46 extends downwardly through the slotted opening 62.

The torque rod 40 and bracket 58 cooperatively provide a counterbalance effort to assist with opening and closing of the tailgate 10, as will now be described. The bracket 58 captures the stationary end 46 and restrains its pivotal movement. The crank end 44 of the torque rod 40 is anchored to the tailgate 10 for pivotal movement with the tailgate 10 for winding and unwinding the elongated portion 42 of the torque rod 40. Consequently, the elongated portion 42 of the torque rod 40 is torsionally wound by the crank end 44 in a first direction when the tailgate 10 is pivoted to the closed position A, such that the tailgate 10 is urged from the closed position A towards the removal position C, thereby providing an opening counterbalance effort for popping open the tailgate 10 when the latch mechanism 23 is unlatched by pulling on the handle 22.

The elongated portion 42 of the torque rod 40 is torsionally wound by the crank end 44 in a second direction when the tailgate 10 is pivoted to the open position B, such that the tailgate 10 is urged from the open position B towards the removal position C, thereby providing counterbalance effort to assist in closing the tailgate 10. The torque rod 40 is completely unwound when the tailgate 10 is pivoted to the removal position C.

To removably lift the tailgate 10 and the torque rod 40 from the truck body 12, the straps 24 are detached and the tailgate 10 is pivoted to the removal position C in which the tailgate 10, the stationary end 46 and the slotted opening 62 of the rigid bracket 58 are parallel. The tailgate 10 is manually lifted until the pin 30 and shaft 32 are removably lifted out of the first and second trunnions 34, 36, as previously described, and the stationary end 46 is released from the slotted opening 62 as enabled by the completely unwound neutral position of the torque rod 40. Thus, the tailgate 10 and torque rod 40 are easily removably lifted from the truck body 12.

Referring to FIG. 1, the torque rod 40 is subassembled to the tailgate 10 as follows. The torque rod 40 is laterally inserted through an access opening 52 in the left side panel 20 of the tailgate 10 until the stationary end 46 is aligned above the aperture 54 on the lower edge of the tailgate 10. The torque rod 40 is lowered so that the stationary end 46 extends downwardly out through the aperture 54 as permitted by a support bearing 56 mounted in the tailgate 10, such that the elongated portion 42 is rotatably supported by the bearing 56. Thereafter, the anchoring end 48 of the crank end 44 is inserted through the lanced reinforcement plate 50 thereby anchoring the crank end 44 to the tailgate 10.

To install the tailgate 10 and the torque rod 40 to the truck body 12, the tailgate 10 is held at the angle α of the removal position C. The tailgate 10 is lowered at the angle α to the truck body 12, such that the stationary end 46 is captured by releasable slip-fitted connection in the slotted opening 62 of the bracket 58. The shaft 32 is then laterally inserted into the second trunnion 36 after which the pin 30 is downwardly inserted into the slot 38 of the first trunnion 34. The straps 24 may then be connected. Thus, the tailgate 10 and torque rod 40 are easily installed on the truck body 12.

It will be appreciated that the diameter of the torque rod 40 may be adjusted depending on the amount of counterbalance effort desired. Preferably, the amount of closing counterbalance force is approximately equal to the weight of the tailgate in the open horizontal position so that the tailgate 10 will maintain the horizontal position when free of outside forces.

It will also be appreciated that in the closed position A, the opening counterbalance force urges the tailgate 10 against the latch mechanism 23 so that vibration of the tailgate 10 in the closed position A is inherently reduced.

Furthermore, the angle α of the removal position C is preferably 15-20 from the vertical closed position A of the tailgate 10. This provides for assistance in closing the tailgate 10, yet still provides a popping open effect.

Thus, the torque rod 40 and bracket 58 provide an improved counterbalance mechanism for a removable tailgate 10 which assists with opening and closing of the tailgate, and yet permits facile removal of the tailgate 10 and torque rod 40 from the truck body 12. Furthermore, the torque rod 40 is subassembled with the tailgate 10, and the tailgate 10 and torque rod 40 are easily installed on the truck body 12.

Although the preferred embodiment utilizes the pin 30, the shaft 32, and first and second trunnions 34, 36 to removably connect the tailgate 10 to the truck body 12, it will be understood that any hinged mounting configuration which removably connects the tailgate 10 to the truck body 12 may be utilized with the torque rod 40 and bracket 58. Thus, an inherent advantage of the preferred embodiment is that the counterbalance mechanism is completely independent of the hinged mounting of the tailgate 10 to the truck body 12 so that the counterbalance mechanism may be added to any existing removable tailgate 10 without modification of the hinged mounting configuration.

Although the preferred embodiment also utilizes the lanced reinforcement plate 50 and support bearing 56 to mount the torque rod 40 in the tailgate 10, these are merely illustrative and it will be understood that any attachment method which anchors the crank end 44 to the tailgate 10 for pivotal movement with the tailgate 10 and which rotatably supports the elongated portion 42 are equally applicable. It will further be appreciated that the access opening 52 for lateral insertion of the torque rod 40 into the tailgate 10 is merely illustrative, and other subassembly methods, such as removal of the outer panel 16 of the tailgate 10 may be utilized.

Figure 3:
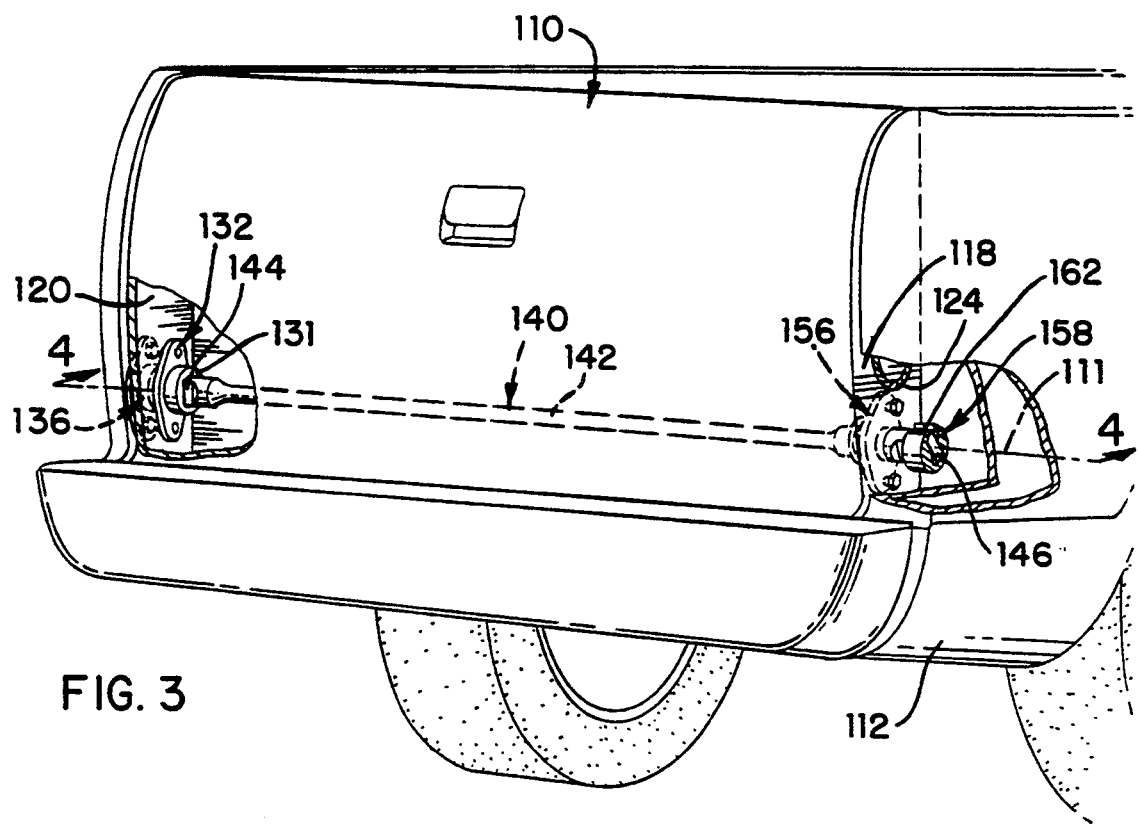
FIG. 3 is a view similar to FIG. 1 showing an alternate embodiment of the invention.
Figure 4:
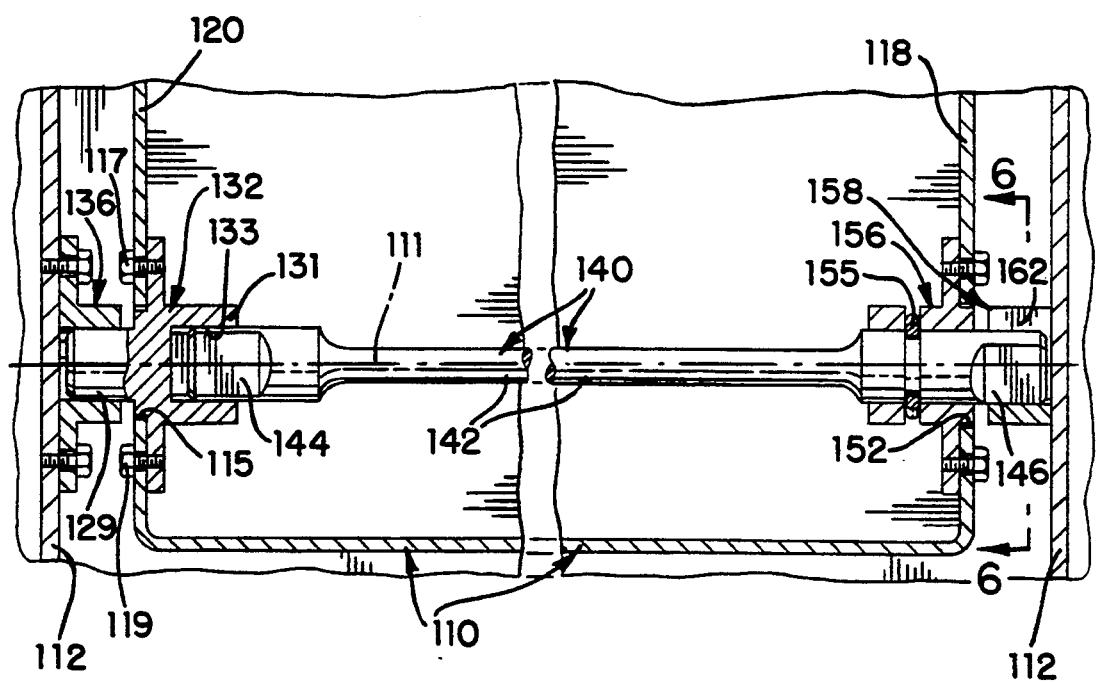
FIG. 4 is a sectional view taken as indicated along line 4—4 of FIG. 3.
Figure 5:
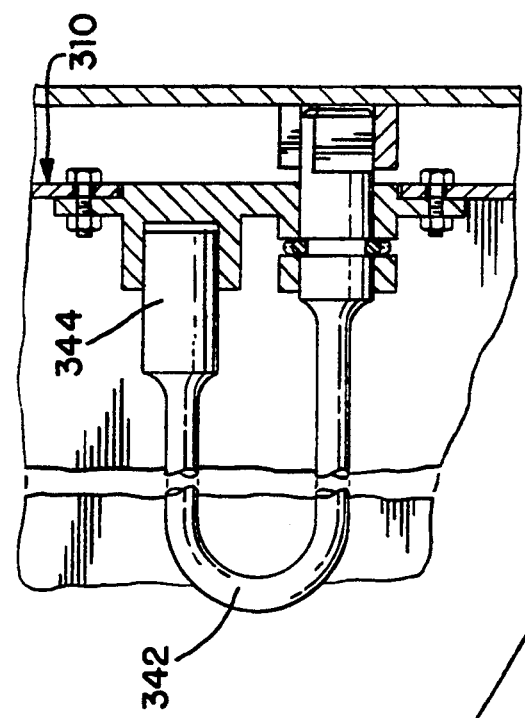
FIG. 5 is an exploded perspective view of the alternate embodiment of FIG. 3.
Figure 5:
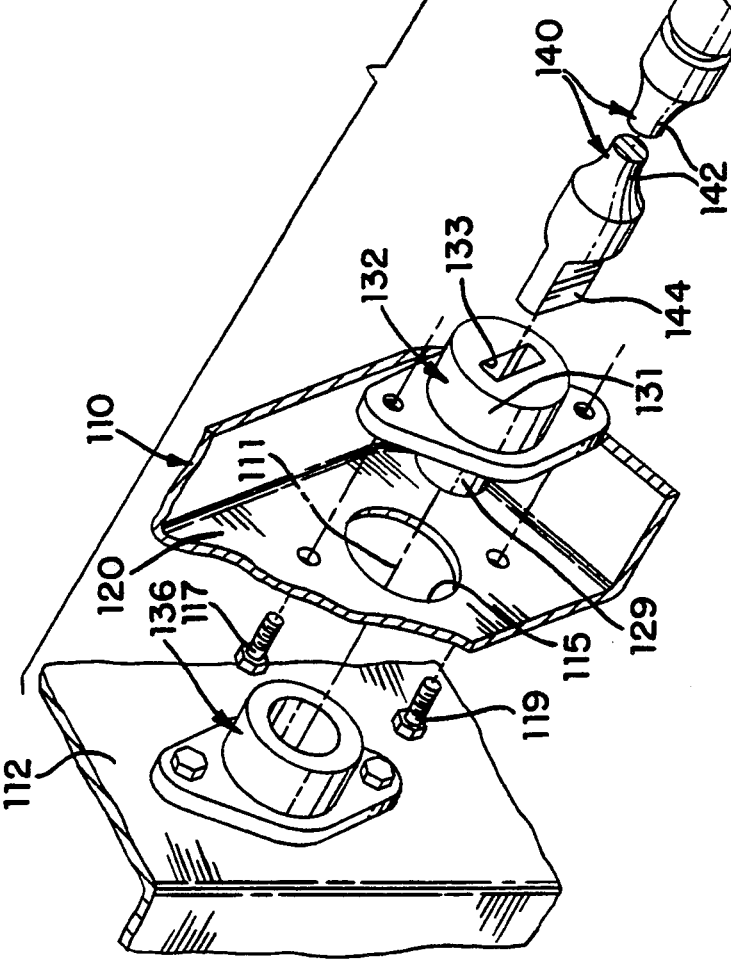

FIGS. 3-8 show an alternate embodiment of the invention. As best shown in FIGS. 3, 4, and 5, a hinge element 132 extends along the hinge axis 111, and is mounted to a left side panel 120 of the tailgate 110, such as by fasteners 117 and 119. The hinge element 132 pivots with the tailgate 110 and has an outer portion 129 which has a circular cross section and an inner portion 131 which has a circular cross section including a slotted aperture 133. A cup-shaped trunnion 136 is carried by the left side of the truck body 112 and extends along the hinge axis 111. The outer portion 129 of the hinge element 132 extends out through a panel aperture 115 of the left side panel 120 and is rotatably supported within the trunnion 136.

A torque rod counterbalance spring 140 is carried by the tailgate 110 and includes an elongated portion 142 extending between a crank end 144 and a stationary end 146. The crank end 144 and the stationary end 146 both extend parallel to the longitudinal axis of the elongated portion 142. The crank end 144 has an oblong-shaped cross section for matably engaging with the slotted aperture 133 of the inner portion 131 of the hinge element 132 to anchor the crank end 144 to the tailgate 110 for pivotal movement with the tailgate 110. The stationary end 146 has an oblong-shaped cross section and projects out through an aperture 152 in a right side panel 118 of the tailgate 110 along the hinge axis 111.

Figure 7:
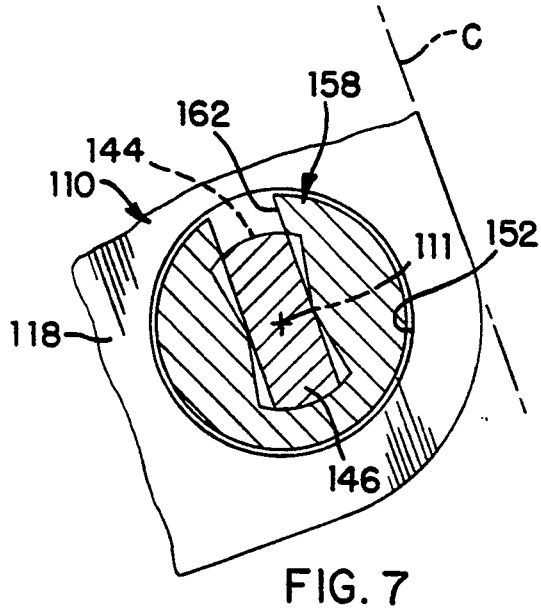
FIG. 7 is a view similar to FIG. 6 but showing the torque rod when the tailgate is pivoted to the tailgate removal position C.

A receptacle 158 is carried by the right side of the truck body 112 adjacent the aperture 152, extends along the hinge axis 111, and has a circular cross section with a slotted opening 162 for capturing the stationary end 146 of the torque rod 140 therein by a releasable slip-fitted connection therewith so that the stationary end 146 and the receptacle 158 cooperatively define the hinge axis 111 of the tailgate 110. The slotted opening 162 is parallel to the tailgate 110 when the tailgate 110 is pivoted to the removal position C as shown in FIG. 7. The slotted opening 162 is sized larger than the cross section of the stationary end 146 for easily capturing and releasing the stationary end 146.

The torque rod 140 and receptacle 158 cooperatively provide a counterbalance effort to assist with opening and closing of the tailgate 110 in a similar manner as previously described for the torque rod 40 and bracket 58 in the embodiment shown in FIGS. 1 and 2. The receptacle 158 captures the stationary end 146 to restrain pivotal movement of the stationary end 146 so that the torque rod 140 is torsionally wound when the tailgate 110 is pivoted away from the removal position C to provide a counterbalance force for continuously urging the tailgate 110 towards the removal position C. The torque rod 140 is completely unwound when the tailgate 110 is pivoted to the removal position C.

Figure 6:
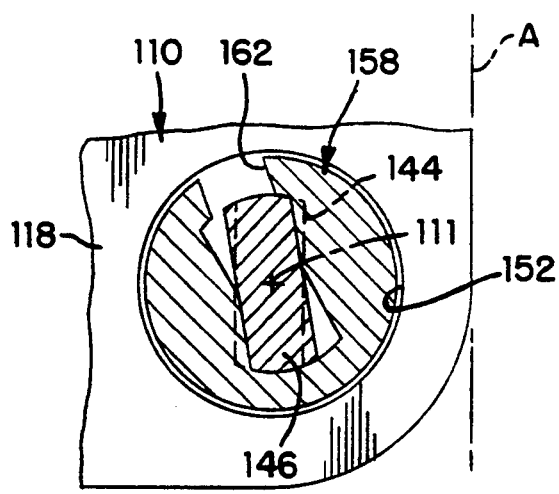
FIG. 6 is a sectional view taken along line 6—6 of FIG. 4 showing the torque rod when the tailgate is pivoted to the closed position A.
Figure 8:
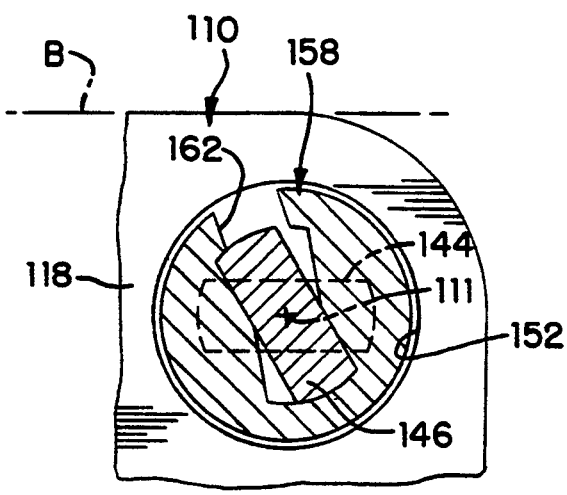
FIG. 8 is a view similar to FIG. 6 but showing the torque rod when the tailgate is pivoted to the open position B.

FIG. 6 and FIG. 8 show that the vertical axis of the oblong cross section of the stationary end 146 is not parallel to the slotted opening 162 and is not parallel to the vertical axis of the oblong cross section of the crank end 144 when the crank end 144 is pivoted with the tailgate 110 to the closed position A or to the open position B, FIG. 8 shows that the vertical axis of the oblong cross section of the stationary end 146 is parallel to the slotted opening 162 and the vertical axis of the oblong cross section of the crank end 144 when the crank end 144 is pivoted with the tailgate 110 to the removal position C in which the torque rod 140 is completely unwound.

The tailgate 110 is removably connected to the truck body 112, such that the tailgate 110 and torque rod 140 may be removably lifted from the truck body 112 when the tailgate 110 is pivoted to the removal position C. The tailgate 110 is manually lifted so that the stationary end 146 is released from the slotted opening 162 as enabled by the completely unwound position of the torque rod 140, and then the outer portion 129 of the hinge element 132 is laterally pulled out of the trunnion 136. Thus, the tailgate 110 and torque rod 140 are easily removably lifted from the truck body 112.

Referring to FIG. 5, the torque rod 140 is subassembled to the tailgate 110 by being laterally inserted through an access opening 152 in the right side panel 118 of the tailgate 110 until the crank end 144 is fully inserted into the slotted aperture 133 of the inner portion 131 of the hinge element 132. In the assembled position, the stationary end 146 extends out through the access aperture 152. The elongated portion 142 of the torque rod 140 is rotatably supported by a bearing 156 mounted on the inside of the right side panel 118 of the tailgate 110. Additionally, a retainer 155 may be used to maintain the torque rod 140 in the bearing 156.

To install the tailgate 110 and the torque rod 140 to the truck body 112, the tailgate 110 is held at the angle α of the removal position C. The tailgate 110 is lowered to the truck body 112, such that the outer portion 129 of the hinge element 132 is laterally inserted into the trunnion 136 and the stationary end 146 is downwardly inserted into the slotted opening 162 of the receptacle 158. Thus, the tailgate 110 and torque rod 140 are easily installed on the truck body 112.

It will be appreciated that the receptacle 158 functions as both the rigid bracket 58 and the first trunnion 34 of the preferred embodiment in FIGS. 1 and 2. It will further be appreciated that the slotted opening 162 may have widened divergent portions which assist in maintaining connection of stationary end 146 to the receptacle 158 when the tailgate 110 is pivoted away from the removal position C as best shown in FIGS. 6 and 8.

Figure 9:
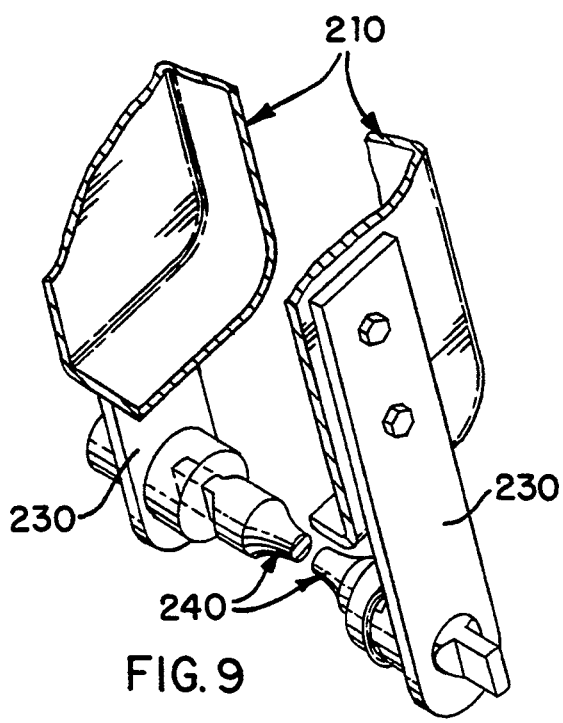
FIG. 9 shows another alternate embodiment of the invention in which the torque rod is carried below the tailgate.

FIG. 9 shows another alternate embodiment of the invention similar to the embodiment shown in FIGS. 3–8, but in which the torque rod 240 is carried below the tailgate 210, such as by mounting brackets 230.

Figure 10:
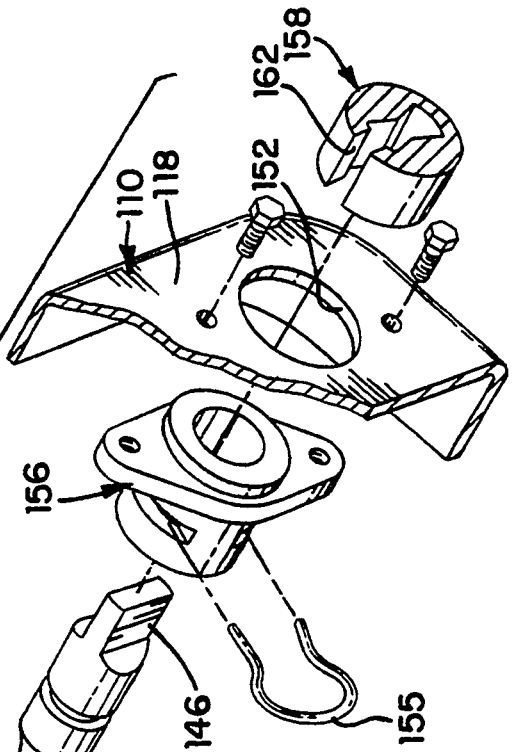
FIG. 10 shows yet another alternate embodiment of the invention in which the torque rod has a folded elongated portion.

FIG. 10 shows yet another alternate embodiment of the invention similar to the embodiment shown in FIGS. 3–8, but in which the elongated portion 342 is folded, such that the crank end 344 is anchored to the right side of the tailgate 310.

It will be understood that a person skilled in the art may make modifications to the specific embodiment shown herein within the scope and intent of the claims. For example, although the invention is illustrated with a tailgate on a truck body, it is equally applicable to other removable closure panels hingedly mounted to other vehicle bodies.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. In a vehicle body having a closure panel removably connected to the vehicle body for pivotal movement about a hinge axis and in which the panel is pivoted to a panel removal position, the improvement comprising:
   a torque rod counterbalance spring carried by the panel and having an elongated portion extending between a crank end anchored to the panel for pivotal movement therewith and a stationary end;
   a receptacle anchored to the vehicle body and capturing the stationary end of the torque rod therein to restrain pivotal movement thereof so that the torque rod is torsionally wound when the panel is pivoted away from the panel removal position to provide a counterbalance force for continuously urging the panel towards the panel removal position, and the torque rod is completely unwound when the panel is pivoted to the panel removal position;
   and said receptacle including a slotted opening capturing the stationary end by a releasable slip-fitted connection therewith so that the stationary end is released from the slotted opening of the receptacle when the panel is removably lifted from the vehicle body;
   whereby the torque rod and receptacle cooperatively provide a counterbalance effort to assist with pivotal movement of the panel, and yet permit facile removal of the panel and the torque rod from the vehicle body.

2. In a vehicle body having a closure panel removably connected to the vehicle body for pivotal movement about a hinge axis between an open position and a closed position, and in which the panel may be removably lifted from the vehicle body when the panel is pivoted to a partially open panel removal position, the improvement comprising:
   a torque rod counterbalance spring carried by the panel and having an elongated portion parallel to the hinge axis of the panel and extending between a crank end anchored to the panel for pivotal movement therewith and a laterally bent stationary end projecting downwardly out through the panel;
   a support means anchored to the vehicle body and underlying the panel for capturing the stationary end of the torque rod to restrain pivotal movement thereof so that the torque rod is torsionally wound when the panel is pivoted away from the panel removal position to provide a counterbalance force for continuously urging the panel towards the panel removal position, and the torque rod is completely unwound when the panel is pivoted to the panel removal position;
   and said support means comprising a rigid bracket having a slotted opening capturing the stationary end by a releasable slip-fitted connection therewith so that the stationary end is released from the slotted opening of the support means when the panel is removably lifted from the vehicle body;
   whereby the torque rod and support means cooperatively provide a counterbalance effort to assist with opening and closing of the panel, and yet permit facile removal of the panel and the torque rod from the vehicle body.

3. The improvement of claim 2 further characterized by the panel and the slotted opening of the rigid bracket being parallel when the panel is pivoted to the panel removal position.

4. The improvement of claim 2 further characterized by the panel, the stationary end, and the slotted opening being parallel when the panel is pivoted to the panel removal position.

5. The improvement of claim 2 further characterized by the crank end being laterally bent relative the elongated portion.

6. The improvement of claim 5 further characterized by the panel, the crank end, the stationary end, and the slotted opening being parallel when the panel is pivoted to the panel removal position.

7. In a vehicle body having a closure panel removably connected to the vehicle body for pivotal movement about a hinge axis between an open position and a closed position, and in which the panel may be removably lifted from the vehicle body when the panel is pivoted to a partially open tailgate removal position, the improvement comprising:
   a torque rod counterbalance spring carried by the panel and having an elongated portion extending between a crank end anchored to the panel for pivotal movement therewith and a stationary end projecting out through the panel along the hinge axis;

a support means anchored to the vehicle body and comprising a receptacle for capturing the stationary end therein so that the stationary end and receptacle cooperatively define the hinge axis of the panel;

said receptacle capturing the stationary end therein to restrain pivotal movement of the stationary end so that the torque rod is torsionally wound when the panel is pivoted away from the panel removal position to provide a counterbalance force for continuously urging the panel towards the panel removal position, and the torque rod is completely unwound when the panel is pivoted to the panel removal position;

and said receptacle having a slotted opening capturing the stationary end by a releasable slip-fitted connection therewith so that the stationary end is released from the slotted opening of the receptacle when the panel is removably lifted from the vehicle body;

whereby the torque rod and support means cooperatively provide a counterbalance effort to assist with opening and closing of the panel, and yet permit facile removal of the panel and the torque rod from the vehicle body.

8. The improvement of claim 7 further characterized by the panel and the slotted opening being parallel when the panel is pivoted to the panel removal position.

9. The improvement of claim 7 further characterized by the stationary end having an oblong-shaped cross section to enable releasable slip-fitted connection with the slotted opening.

10. The improvement of claim 9 further characterized by the panel, the vertical axis of the oblong-shaped cross section of the stationary end, and the slotted opening being parallel when the panel is pivoted to the panel removal position.

* * * * *